(12) United States Patent
Sullivan (10) Patent No.: US 8,090,726 B2
(45) Date of Patent: ***Jan. 3, 2012

(54) METHODS AND SYSTEMS FOR NODE RANKING BASED ON DNS SESSION DATA

(75) Inventor: Alan T. Sullivan, Leesburg, VA (US)

(73) Assignee: Paxfire, Inc., Sterling, VA (US)

( * ) Notice: Subject to any disclaimer, the term of this patent is extended or adjusted under 35 U.S.C. 154(b) by 100 days.

This patent is subject to a terminal disclaimer.

(21) Appl. No.: 12/541,663

(22) Filed: Aug. 14, 2009

(65) Prior Publication Data

US 2009/0319367 A1  Dec. 24, 2009

Related U.S. Application Data

(62) Division of application No. 11/550,975, filed on Oct. 19, 2006, now Pat. No. 7,593,935.

(51) Int. Cl.
*G06F 17/30* (2006.01)

(52) U.S. Cl. ........ 707/751; 709/224; 715/207; 715/230; 715/256

(58) Field of Classification Search ........... 707/999.005, 707/999.007, 999.01, 723, 726, 748, 751; 715/207, 230, 256; 709/224
See application file for complete search history.

(56) References Cited

U.S. PATENT DOCUMENTS

| | | | |
|---|---|---|---|
| 6,195,698 B1 | 2/2001 | Lillibridge et al. | |
| 6,278,992 B1 | 8/2001 | Curtis et al. | |
| 6,285,999 B1 | 9/2001 | Page | |
| 6,647,381 B1 * | 11/2003 | Li et al. | 1/1 |
| 6,792,458 B1 | 9/2004 | Muret et al. | |
| 6,804,701 B2 | 10/2004 | Muret et al. | |
| 7,174,346 B1 | 2/2007 | Gharachorloo et al. | |
| 7,216,123 B2 | 5/2007 | Kamvar et al. | |
| 7,251,654 B2 | 7/2007 | Eiron et al. | |
| 7,254,580 B1 | 8/2007 | Gharachorloo et al. | |
| 7,308,643 B1 | 12/2007 | Zhu et al. | |
| 7,421,155 B2 * | 9/2008 | King et al. | 382/312 |
| 7,437,364 B1 | 10/2008 | Fredricksen et al. | |
| 7,587,412 B2 * | 9/2009 | Weyl et al. | 1/1 |
| 7,599,844 B2 * | 10/2009 | King et al. | 705/1.1 |
| 7,752,200 B2 * | 7/2010 | Scholl et al. | 707/730 |
| 7,797,299 B2 * | 9/2010 | Thrasher | 707/706 |
| 7,809,709 B1 * | 10/2010 | Harrison, Jr. | 707/707 |
| 2005/0015466 A1 | 1/2005 | Tripp | |
| 2005/0033742 A1 | 2/2005 | Kamvar et al. | |
| 2006/0098899 A1 | 5/2006 | King et al. | |
| 2008/0028066 A1 * | 1/2008 | Berkhin et al. | 709/224 |
| 2008/0177994 A1 * | 7/2008 | Mayer | 713/2 |

* cited by examiner

*Primary Examiner* — Jean M Corrielus (57) ABSTRACT

Systems and methods for ranking pages and/or hosts in a faster and more relevant manner are provided. Systems and methods for ranking pages and/or hosts based on session data and/or traffic data are also provided. According to the invention, session maps can be created using DNS and/or ISP data. Systems and methods for ranking pages and/or hosts for the purpose of doing business are also provided.

6 Claims, 4 Drawing Sheets

METHODS AND SYSTEMS FOR NODE RANKING BASED ON DNS SESSION DATA

CROSS-REFERENCE TO RELATED APPLICATIONS

This application is a divisional application of U.S. patent application Ser. No. 11/550,975, filed 19 Oct. 2006, now U.S. Pat. No. 7,593,935, the entire disclosure of which is hereby incorporated herein by reference.

BACKGROUND OF THE INVENTION

1. Field of the Invention

The present invention relates generally to information retrieval systems and more particularly to methods and systems for ranking nodes in a collection.

2. Description of Related Art

The Internet is a global network of individual computers (such as clients and servers) linked to each other by the Internet Protocol. The World Wide Web allows client programs to retrieve information (such as Web pages or files) from the Internet based on Uniform Resource Locators (URLs; also known as Uniform Resource Indicators or URIs). An example of a client program is a web browser that runs on a user's computer to help locate web pages or files. Each web page or file is associated with a unique URL that allows client programs to specify the host server that the web page or file is stored on. The main components of a URL include the scheme, the host or server name, the port, the path, and/or a query. For example, if a user enters http://example.com/index, the scheme or access type is "http", the host or server name is "example.com", and the path is "index". Sometimes, the user might enter a query in a browser toolbar on his local browser program to request something specific. Instead of entering the URL of a page, a user may also follow a hypertext link to a page or resource. However, before the client computer can make a connection to the server to retrieve the page, the host or server name portion of the URL must be converted to an IP address. The Domain Name Service (DNS) is a global distributed Internet database network that relies on resolvers and name servers, and is used to map host or server names to their associated IP address.

In this global network, each web site or web page is assigned a unique URL and associated identifying number called an Internet Protocol Address or IP Address. The IP Address of each web site is stored in one or more DNS servers which, in turn, provide that address to other computers in response to queries for that site. Oftentimes, users do not know the IP Address or URL of the web page containing the information they are looking for, or if such a page even exists. In this case, a user will typically enter keywords into a search engine or link to the web site from a referring web site. To perform a keyword search, a user will often go to the site of an Internet search engine, such as Google™ or Yahoo™, and type in one or more words or phrases that are relevant to his query. In response to the keyword search, a search engine will typically return several URLs, from which the requester can select the most appropriate web page for his purposes. However, the pages returned in response to a query are often quite numerous, in which case the user is often required to sort through many results before finding the page of interest. For example, if a user types in the word "car", the result returned by the search might be a lengthy list of web sites ranging from car manufacturers, car dealerships, car repair shops, car enthusiast clubs, and the like. For this reason, web sites are often "ranked" to further sort the results of a query by relevance.

Various techniques for ranking web pages are known in the art. U.S. Pat. No. 6,285,999 to Page describes a query-independent model for ranking pages in the World Wide Web. The patent relates to the "PageRank" algorithm which relies on the static link structure of the Web and iterative techniques to form the basis for Google's search engine page rankings. For example, if $r_{k+1}(P_i)$ is the PageRank of page $P_i$ at iteration k+1, the PageRank algorithm may be denoted as:

$$r_{k+1}(P_i) = \sum_{P_j \in B_{P_i}} \frac{r_k(P_j)}{|P_j|}, \quad \text{(Eqn. 1)}$$

where $B_{P_i}$ is the set of pages backlinking to $P_i$ (1).

Figure 1:
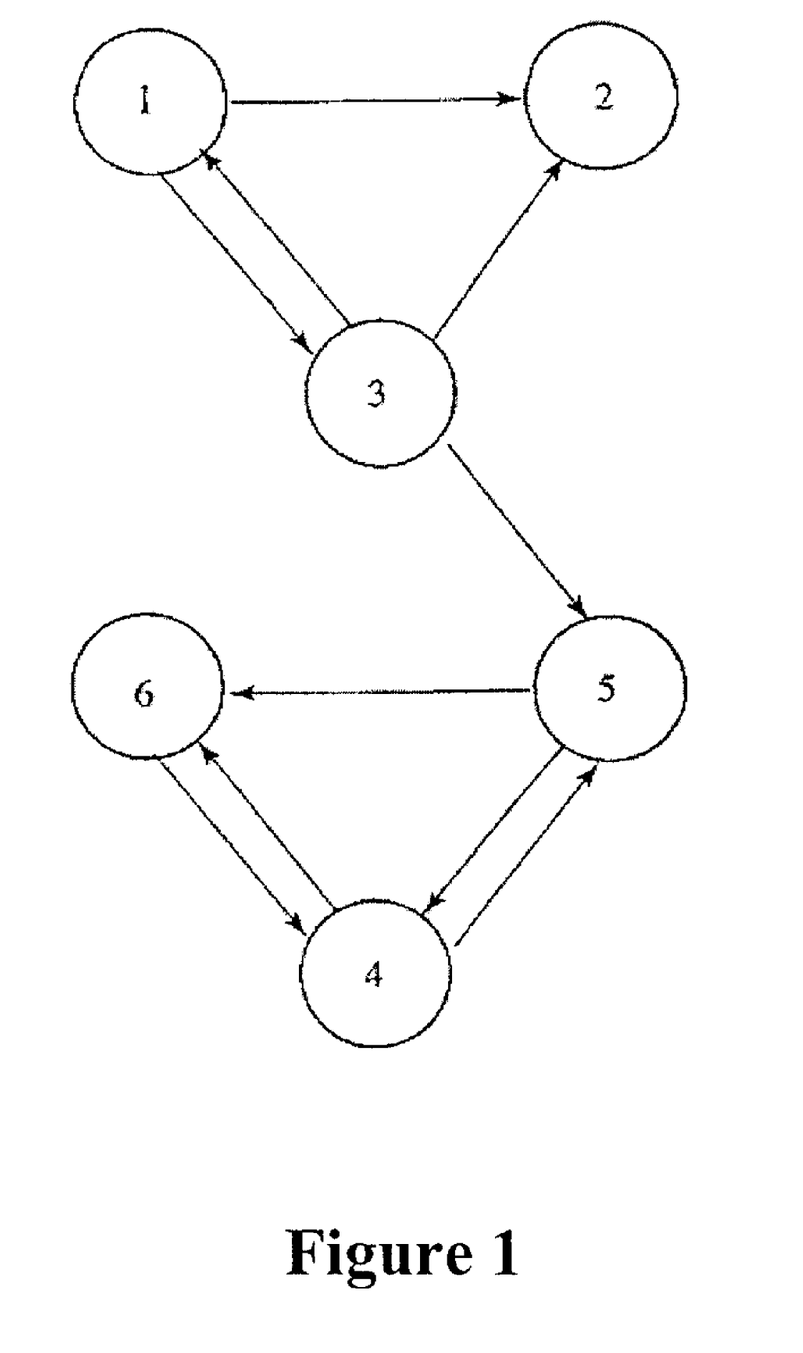
FIG. 1 illustrates a portion of a directed web graph.

In general, PageRank measures the relative "popularity" or "importance" of a page based on the number of pages, or "in-links", that point to it. As an illustration, FIG. 1 shows a directed graph representing six pages (denoted as nodes 1-6) (1). Using the depicted nodes and links, a normalized hyperlink matrix H may be formed representing the status of the links from a given node i to a node j.

$$H = \begin{pmatrix} & P_1 & P_2 & P_3 & P_4 & P_5 & P_6 \\ P_1 & 0 & 1/2 & 1/2 & 0 & 0 & 0 \\ P_2 & 0 & 0 & 0 & 0 & 0 & 0 \\ P_3 & 1/3 & 1/3 & 0 & 0 & 1/3 & 0 \\ P_4 & 0 & 0 & 0 & 0 & 1/2 & 1/2 \\ P_5 & 0 & 0 & 0 & 1/2 & 0 & 1/2 \\ P_6 & 0 & 0 & 0 & 1 & 0 & 0 \end{pmatrix} \quad \text{(Eqn. 2)}$$

For the above matrix, equation 1 may be re-written as:

$$\pi^{(k+1)T} = \pi^{(k)T} H \quad \text{(Eqn. 3)}$$

In reality, the matrix of the entire web is an immense matrix that does not always contain ideal conditions. Accordingly, many adjustments have been made to the original PageRank algorithm, resulting in the Google Matrix G:

$$G = \alpha S + (1-\alpha)1/nee^T \quad \text{(Eqn. 4)}$$

Thus, after various adjustments, the PageRank method turns out to be:

$$\pi^{(k+1)T} = \pi^{(k)T} G \quad \text{(Eqn. 5)}$$

which may be solved by applying the power method to G.

It typically takes a long time to compute PageRank for the Web using the power method. Because PageRank takes such a long time to compute, rankings can only be updated after certain intervals. Thus, the rankings are generally not as accurate at the end of the interval as they are at the beginning. While "out-of-date" rankings might not significantly impact pages whose content rarely changes, they are not reliable for pages with rapidly changing content (such as pages providing news and current events).

There are several other notable drawbacks to PageRank as well. For one, PageRank tends to favor older pages. This is because new pages initially will not have many links (unless they are part of an existing site). Moreover, due to the reliance upon the static nature of Web links, PageRank values can be easily manipulated (e.g., by creating link farms) to improve search result rankings and monetize advertising links. For example, any page with a low PageRank can be redirected to a page with a high PageRank, thereby causing the page with the low PageRank to assume the PageRank of the page it is pointing to. In addition, pages with no incoming links can be redirected to the Google home page and by the next PageRank update, the new page will be upgraded to a higher PageRank (this is called spoofing and is another flaw in the PageRank system). These weaknesses, and others, have severely impacted the reliability of PageRank, which seeks to determine which documents are actually highly valued in by the Web community. Google is known to actively penalize link farms and other schemes designed to artificially inflate PageRank. How Google identifies link farms and other PageRank manipulation tools are among Google's trade secrets.

In "Exploiting the Block Structure of the Web for Computing PageRank" (2), and in U.S. Patent Application Publication No. 2005/0033742, Kamvar and colleagues introduce a ranking technique termed "BlockRank" for speeding up the processing times of PageRank based on aggregation principles and the structure of the Web. These documents and the technology disclosed in them seek to address problems encountered by PageRank, by providing a ranking technique aimed at reducing the number of iterations required, as well as the work per iteration. In general, the BlockRank model approximates the global PageRank by dividing the webgraph into k blocks and performing calculations on a compact representation of the webgraph. The compact representation is obtained by aggregating pages of a host to a single node using conventional aggregation principles. See also references (3) and (4), below.

According to Kamvar and colleagues, local PageRank values can be calculated for each individual host by ignoring "inter-host" links. Thus, the "local PageRank vector" $l_J$ of a block J ($G_{JJ}$) may be defined as the result of the PageRank algorithm applied only on block J (ignoring interlinks to other hosts) such that:

$$\vec{l}_J = \text{pageRank}(G_{JJ}, \vec{s}_J, \vec{v}_J) \quad \text{(Eqn. 6)}$$

where the start vector $s_{J is}$ the $n_J \times 1$ uniform probability vector, and the personalization vector $v_J$ is the $n_J \times 1$ vector whose elements are all zero except the element corresponding to the root node of block J, whose value is 1.

In addition to local page ranks, the relative importance of each block may also be computed. Thus, assuming there are k blocks in the Web, a block graph B is created where each vertex in the graph corresponds to a block in the web graph. The weight of an edge $B_{IJ}$ between two blocks is given by:

$$B_{IJ} = \Sigma A_{ij} \cdot l_i \quad \text{(Eqn. 7)}$$

and may be written in matrix notation such that a PageRank matrix L is the n×k matrix whose columns are the local PageRank vectors $l_j$:

$$L = \begin{pmatrix} \vec{l}_1 & \vec{0} & \cdots & \vec{0} \\ \vec{0} & \vec{l}_2 & \cdots & \vec{0} \\ \vdots & \vdots & \ddots & \vdots \\ \vec{0} & \vec{0} & \cdots & \vec{l}_K \end{pmatrix} \quad \text{(Eqn. 8)}$$

A matrix S is then defined to be the n×k matrix that has the same structure as L with all nonzero entries replaced by 1. The k×k block matrix B is then:

$$B = L^T A S \quad \text{(Eqn. 9)}$$

where B is a transition matrix representing the transition probability of block I to block J. The PageRank algorithm may then be applied to the reduced matrix resulting in the BlockRank vector b:

$$\vec{b} = \text{pageRank}(B, \vec{v}_k, \vec{v}_k) \quad \text{(Eqn. 10)}$$

Further according to Kamvar and colleagues, a global PageRank may be approximated using the local PageRanks $l_J$ of the pages in each block, and BlockRank vector b whose elements $b_J$ are the BlockRank for each block J (indicating the relative importance of the blocks). Thus, the global PageRank is approximated by the local PageRank $l_J$ weighted by the BlockRank $b_J$ of the block it resides in. The global page rank x may be approximated in matrix notation as:

$$\vec{x}^{(o)} = L \vec{b} \quad \text{(Eqn. 11)}$$

One advantage to the BlockRank model, as noted by Kamvar and colleagues, is that the local PageRank vectors converge more quickly, thus requiring fewer iterations. Moreover, the local PageRanks can be computed in a distributed or parallel manner and/or pre-computed. In some cases, the local PageRanks may be re-used in future applications. A major drawback to the BlockRank approximation is that some information is lost in the compression or aggregation step by ignoring intra-host links. However, the approximation can be improved by expanding and collapsing repeatedly until convergence is reached. Another drawback is that there do not appear to be any uniform or natural geographic divisions to the blocks in the model, and therefore it might be difficult to determine what populations the blocks are representative of. More importantly, the BlockRank model only addresses static links and does not take into account traffic flow. Because BlockRank only uses static links, it suffers many of the same problems suffered by PageRank All of the above mentioned ranking methodologies measure popularity or relevance of a page or site based on the static link structure of the Web. However such techniques to not take into account the amount of Web traffic with respect to that page and therefore do not provide a true measure of page popularity or relevance.

Tomlin, in "A New Paradigm for Ranking Pages on the World Wide Web" (2003), introduces an alternative method for measuring popularity of a page based on traffic flow (5). Using an entropy-based approach, the traffic flow is subject to conservation conditions of a circulation flow in the entire World Wide Web, an aggregation of the World Wide Web, or a sub-graph of the World Wide Web. According to the traffic flow approach, a traffic rank $p_{ij}$ may be considered the proportion of all Web traffic on a link entering page j from page i (assuming the sum of all $p_{ij} = 1$). An optimization problem shown below may then be used to find the $p_{ij}$'s for the traffic rank model:

$$\max - \sum_{i,j} p_{ij} \log p_{ij} \text{ subject to} \quad \text{(Eqn. 12)}$$

$$\sum_{i,j} p_{ij} = 1,$$

$$\sum_i p_{ij} - \sum_i p_{ji} = 0,$$

for every j, $$p_{ij} \geq 0.$$

Thus, in contrast to PageRank or BlockRank approaches, traffic flow models measure the "popularity" of a page, or node, based on the amount of traffic to and/or from that node, rather than the number of static links to the node.

Another traffic flow technique, termed "TrafficRank", is used by Alexa Internet, Inc. (6). Generally speaking, Alexa calculates traffic rankings for websites by analyzing Internet traffic of millions of Alexa Toolbar users (where the traffic ranks are typically based on months of aggregated traffic data). However, one drawback to this approach is that such TrafficRank results contain inherent biases and therefore do not necessarily reflect a representative sample of the global Internet population. For example, the Alexa Toolbar only works with the Internet Explorer browser (i.e., it is not supported by Mozilla, AOL, Netscape, etc.) and on Windows operating systems. In addition, in some cases, TrafficRank calculations can take longer than PageRank calculations (especially on a large scale).

Although there are already numerous drawbacks to existing page ranking techniques as previously discussed, they further lack the ability to perform service tasks at the ISP level of operation, thus limiting the functionality and capability of such systems and methods. Because search engines currently operate globally at central locations within the cloud computing of the Internet, queries cannot be resolved to their origin of request. Search engines are thus limited in conducting reliable business services and tracking such as, market channel tracking, web page usage, DNS statistics, and so forth. These services and tracking are currently only possible from the edge of the Internet, which is where ISPs sit.

Thus, there remains a need to rank pages more quickly and efficiently. In addition, there also exists a need to rank pages in a manner more relevant to a particular user or group of users or the behavior of users or a group of users. Furthermore, there remains a need to provide participating service partners and/or ISPs with valuable session data and/or the ability to provide more relevant information in response to one or more queries.

SUMMARY OF THE INVENTION

The present invention provides methods and systems for ranking nodes, pages, and/or hosts more relevantly and efficiently than other methods and systems known in the art. In general, the methods and systems are applied at the Internet Service Provider (ISP) level of the Internet infrastructure, and use information that is specific for an ISP or collection of ISPs. Such ISPs may include: commercial ISPs that administer static or dynamic IP addresses to users; businesses; corporations; or organizations that administer internal static or dynamic IP addresses to users. Broadly speaking, the methods and systems rank traffic at each ISP, where the ranking involves looking at the ISP DNS and creating one or more search vectors for search sequences. The solution provided by the present invention is scalable, efficient, and effective. It eliminates the need for total reliance on national or global search engines by providing services through one or more ISPs. It thus eliminates the need for total reliance on national or global ad content providers, and allows ad content to be delivered to network (e.g., Internet) users on a geographically relevant basis. It also allows personalization of search results which allows results to be driven by user behavior. Due to its relative speed and timeliness, it further allows time-relevant content, such as ad content, to be delivered in response to network queries.

In a first aspect, the invention provides a method for creating session maps representing user requests based on DNS data. According to the invention, pages and/or hosts may be ranked using information in the session maps. It is to be understood that the methods and systems disclosed herein apply to ranking any sets and/or subsets; classes and/or subclasses; exchanges and/or extensions; parent nodes and/or child nodes, etc., and are therefore not meant to be limited to pages and/or hosts, which are discussed by way of example. In general, the method comprises: a) obtaining DNS data, including page requests, for a particular session; b) identifying one or more sequences of page and/or host requests to one or more users based on the DNS data; and c) creating a session map of page and/or host sequences for the particular session. In preferred embodiments, the method comprises ranking Internet traffic at an ISP based on DNS lookups passing through the ISP and providing ranked search results to the user submitting a query. The method may be implemented by way of computer software, such as through one or more computer programs.

In another aspect, the invention provides a method for ranking pages and/or hosts. In general, the method comprises: a) obtaining DNS data, including host of page requests, for a particular session; b) identifying one or more sequences of host requests to one or more users based on the DNS data; and c) ranking pages based at least in part on the identified sequences of hosts. The method can comprise ranking Internet traffic at an ISP based on DNS lookups passing through the ISP. The DNS lookups can be used to populate traffic ranks for various web sites, web pages, hosts, etc. In preferred embodiments, the method further comprises providing ranked search results to the user submitting a query, where the ranked search results are presented as a listing of URLs or links, based on the ranking. The method may be implemented by way of computer software, such as through one or more computer programs.

In an additional aspect, the invention provides hardware. In general, the hardware comprises at least one processor for processing data and/or computer code. Thus, it is typically a computer or computing device. The hardware can comprise any suitable components known in the art as applicable for computer hardware. For example, it may be a computer, such as an Internet appliance, for example of the type available from Paxfire, Inc. (Herndon, Va.). Likewise, it may be a DNS server or other computer owned and/or operated by an ISP.

In another aspect, the invention provides a system for ranking pages and/or hosts. In general, the system comprises computer hardware and computer software that can be implemented together to rank search results based in part on DNS data, for example to rank Internet traffic at an ISP based on DNS lookups passing through the ISP, or to create session maps. Though not required, the system often comprises one or more processors owned and/or operated by an ISP. In typical configurations, one or more DNS servers are part of the system. The system can also provide ranked results for searches submitted by users, along with content-relevant, geographically-relevant, and/or time-sensitive or time-relevant results, such as ad content.

In yet another aspect, the invention provides a storage medium for storing computer programs, files, data, etc. The storage medium may be any of the known media for long-term or short-term storage of computer information. In some embodiments, the storage medium is a portable storage medium, which can be inserted and removed from a computer.

In a further aspect, the invention provides a method of doing business using a computer, and preferably a computer connected to a network, such as the Internet. In general, the method of doing business comprises ranking pages and/or hosts on a network, providing search results based on those ranked pages and/or hosts, and charging receivers of the results, providers of the results, or both, a fee for providing the results. According to the method of doing business, the page ranking is performed according to a method of the present invention.

DETAILED DESCRIPTION OF VARIOUS EMBODIMENTS OF THE INVENTION

Reference will now be made in detail to various exemplary embodiments of the invention, examples of which are illustrated in the accompanying drawings. The following detailed description describes certain embodiments of the invention, and should not be considered as limiting the invention to those embodiments.

In a first aspect, the invention provides a method for creating session maps and/or ranking pages and/or hosts based on DNS data. As a general matter, the method comprises: a method for ranking pages using DNS data, where the method comprises: obtaining DNS data for a particular session; identifying one or more sequences of host requests based on DNS data; and ranking pages and/or hosts based at least in part on the identified sequences of hosts. For example, the method may comprise: a) obtaining DNS data, including page requests, for a particular session; b) identifying one or more sequences of page and/or host requests to one or more users based on the DNS data; and c) creating a session map of page and/or host sequences for the particular session. In embodiments, a) further comprises obtaining DNS data from one or more ISPs. In embodiments, b) further comprises aggregating the page requests to the host that each page resides in, to form sequences of host requests. In yet other embodiments, the method further comprises approximating a global page rank vector based on a combination of a global host rank vector and a local page rank vector.

In embodiments, the method ranks pages and/or hosts at the ISP level using DNS lookups passing through one or more ISPs. The method also includes providing ranked search results to the user submitting a query, where the ranked search results are presented as a listing of URLs or links, based on the ranking. The search results may additionally include ad content based on the search query. The method may be implemented by way of computer software, such as through one or more computer programs.

According to one embodiment, the present invention creates one or more session maps of user requests. A session may be a particular time frame of interest (e.g., minutes, etc.). Alternatively, a session need not be time-based, but may be delineated based upon requests of one or more known users, or groups of users. To create a session map, DNS data, such as lookup data, for a particular session is obtained. Such data includes, among other things, IP Addresses, host names, and domain names. A web server proxy can obtain the following data: Uniform Resource Locators (URLs) of requested pages, typed keywords, times of request and/or referring URLs, etc. Furthermore, sequences of pages visited may be determined by the IP Addresses of requestors, as provided, e.g., by an ISP. The page sequences may be compressed, e.g., to the host that each page resides in, to form sequences of host requests. One or more session maps and/or session vectors may then be formed from the sequences of host requests and optionally used to speed up host and/or page rank calculations by only considering the hosts and/or pages visited during the session as reflected by the session map and/or vector.

Other embodiments comprise additional or alternative steps. For example, in some embodiments, the method comprises: using the session vectors and/or session map to track and/or predict user behavior and/or providing the ranked results to a user in response to a query. In embodiments, the act of ranking pages comprises ranking pages based at least in part on a dynamic traffic flow model and/or a static page ranking model; or it comprises calculating a global host rank vector for hosts in the session, calculating a local page rank vector for pages of each host in the session, and approximating a global page rank vector based on a combination of the global host rank vector and local page rank vector.

In another aspect, the invention provides a method for ranking pages and/or hosts. In general, the method comprises ranking Internet traffic at an ISP based on DNS lookups passing through the ISP. Thus, the method may be a method for ranking pages using DNS session data, where the method comprises: a) obtaining DNS data, including host of page requests, for a particular session; b) identifying one or more sequences of host requests to one or more users based on the DNS data; and c) ranking pages based at least in part on the identified sequences of hosts. The method can further comprise providing the ranked results to a user in response to a query. In embodiments, c) comprises ranking pages based on a dynamic traffic flow model and/or a static page ranking model.

The method may also be a method for ranking pages using DNS session data, where the method comprises: a) obtaining DNS data, including host of page requests, for a particular session; b) identifying or correlating one or more sequences of host requests to one or more users based on the DNS data; c) aggregating the page requests to the host that each page resides in, to form sequences of host requests (which can be performed using DNS); and d) ranking pages and/or hosts based on the identified sequences of page and/or host requests. The method may further comprise as part of d), calculating a global host rank vector for hosts in the session; calculating a local page rank vector for pages of each host in the session; and/or approximating a global page rank vector based on a combination of the global host rank vector and local page rank vector.

In embodiments, the method comprises providing ranked search results to the user submitting a query, where the ranked search results are presented as a listing of URLs or links, based on the ranking. The search results can include ad content based on the search query. Regardless of the embodiment, the method may be implemented by way of computer software, such as through one or more computer programs.

In a further embodiment, "global" PageRank calculations by one or more ISPs may be combined with PageRank calculations by or for one or more other ISPs to form page ranks representing larger collections or groups. For example, "global" page ranks by a first ISP (e.g., Comcast) may be combined with "global" page ranks by a second ISP (e.g., Verizon) to form page ranks for a larger collection (for example, a larger geographical region and/or more comprehensive sample of users).

As should be evident, one aspect of the invention is a computer program that provides instructions for executing one or more of the methods of the invention by a computer. The computer program may be written in any suitable computer language, and may be in the form of source code or object code. It may also be represented by way of flow charts or algorithms or diagrams providing suitable information for one of skill in the art to recognize the steps to be executed by way of computer code. The computer program may be a single unit of code or may comprise multiple units, such as routines, subroutines, modules, and the like. The computer program may also take the form of two or more sets of instructions, each of which provides some or all of the instructions for implementing one or more method of the invention. The computer program may be implemented fully as a single unit on a single piece of hardware (e.g., a computer), or may be partially implemented on one computer and partially implemented on one or more other computers. Furthermore, the computer program may be stored on one or more computers, but executed on another or on others.

In an additional aspect, the invention provides hardware. In general, the hardware comprises at least one processor for processing data and/or computer code. The hardware can comprise any suitable components known in the art as applicable for computer hardware. Electronic components and connections used in the hardware of the invention are those typically used in the computer industry, as are all other structural elements of the hardware (and systems) of the invention. As used herein, the terms "hardware", "Internet appliance", and "device" are used interchangeably unless otherwise specifically noted. Thus, where reference is made to an Internet appliance, it includes a reference to any suitable computer that can serve the intended purpose, including, but not limited to, a DNS server or similar computer.

As used herein, a processor is any hardware, software, or combination of two or more of either or both that can process information within the framework of a computer system. Examples of processors include, but are not necessarily limited to, central processing units (CPU), circuit boards, chips, software, and the like. Where multiple processors are used, they can be connected in serial or parallel. That is, the multiple processors can perform their assigned functions, whether it be a function provided solely by the processor or a function that is redundant to or shared by other processors, at the same time other processors are performing their assigned functions, or one or more processor can act only after one or more other processor has completed its function.

The Internet appliance of the invention generally comprises at least one processor that is capable of executing a computer program or collection of programs that comprise instructions for carrying out at least one method of the present invention. In embodiments, the device comprises two or more processors, each executing some of the instructions or sharing execution of some or all of the instructions. Where the device shares tasks with other hardware (including hardware that is not an Internet appliance of the invention), such as when part of a system (discussed in detail below), there are typically two or more processors distributed in any fashion among the various pieces of hardware. In some embodiments, the Internet appliance comprises one or two processors, which can be physically located on a single piece of hardware, which can be a DNS server in some situations. In embodiments, the hardware thus comprises an Internet appliance, which is implemented as a plug-in to an existing system or piece of hardware. The Internet appliance may be implemented at any layer of the Internet architecture, including Layer 2, Layer 3, or Layer 4, and may be, for example, an Internet appliance of the type available from Paxfire, Inc. (Herndon, Va.). In addition to being a computer as generally recognized in the general population, the hardware may also be or comprise some other type of computing device, which is not generally referred to in the general population as a computer. For example, it can be a hand-held communication device, a portable electronic device that is capable of storing and retrieving information, etc.

In embodiments, the invention provides an Internet appliance comprising: a processor configured to obtain DNS data for a particular session; a processor configured to identify one or more sequences of host requests based on the DNS data; and a processor configured to rank pages and/or hosts based at least in part on the identified sequences of hosts. In some situations, the processor that is configured to rank pages and/or hosts is further configured to: calculate a global host rank vector for hosts in the session; calculate a local page rank vector for pages of each host in the session; and approximate a global page rank based on a combination of the global host rank vector and local page rank vector. One or more processors of the appliance may further be configured to rank pages and/or hosts such that is calculates the global host rank vector using a traffic flow model.

Thus, according to the invention, in embodiments, an Internet appliance is provided, which comprises: means for obtaining DNS data for a particular session; means for identifying one or more sequences of host requests based on the DNS data; and means for ranking pages and/or hosts based at least in part on the identified sequences of hosts. In embodiments, the appliance or device comprises means for obtaining DNS data for a particular session, means for identifying one or more sequences of page requests; means for compressing or aggregating the page requests to the host that each page resides in to form a sequence of host requests; and means for creating a session map of host sequences and/or session vector(s) for the particular session. The Internet appliance of the invention can further or alternatively comprise: means for creating one or more session vectors from the one or more sequences of host requests; and means for creating a session map from the one or more session vectors. It also may further or alternatively comprise: means for tracking and/or predicting user behavior based on the session vectors and/or session map. It likewise can be implemented with means for ranking pages and/or hosts in the session using a dynamic traffic flow and/or static page ranking model, and/or means for providing the ranked results to a user in response to a query.

It should thus be evident that, according to some embodiments of the invention, an Internet appliance is provided, where the appliance includes: means for compressing or aggregating the pages in the collection to the host that each page resides in; means for calculating a global host rank vector based on a traffic flow model; means for calculating a local page rank vector for pages in each host of the collection; and means for estimating a global page rank based on a combination of the global host rank vector and local page rank vector. The Internet appliance may also or alternatively comprise one or more of the following: means for collecting and/or obtaining DNS lookup data from one or more processors; means for identifying one or more sequences of page requests from the DNS lookup data; means for aggregating the page requests to the host that each page resides in to form a compressed session map of host requests; and means for ranking pages and/or hosts in the session map by using a PageRank model, traffic flow model, or appropriate combination thereof. For example, in one embodiment, the Internet appliance includes means for calculating a global host rank vector based on a traffic flow model; means for calculating a local page rank vector for pages in each host using a PageRank model; and means for estimating global page ranks based on a combination of the global host rank vector and local page rank vector.

In another aspect, the invention provides a system for ranking pages and/or hosts. The system may be a distributed system for combining DNS data and/or rankings from one or more processors owned and/or operated by one or more ISPs to form a virtual search engine or engines. In general, the system comprises computer hardware and computer software that can be implemented together to rank Internet traffic at an ISP based on DNS lookups passing through the ISP, that is, to implement one or more methods of the present invention. Though not required, the system often comprises one or more processors owned and/or operated by an ISP. In typical configurations, one or more DNS servers are part of the system. The system can also provide ranked results for searches submitted by users, along with content-relevant, geographically-relevant, and/or time-sensitive or time-relevant results.

Figure 5:
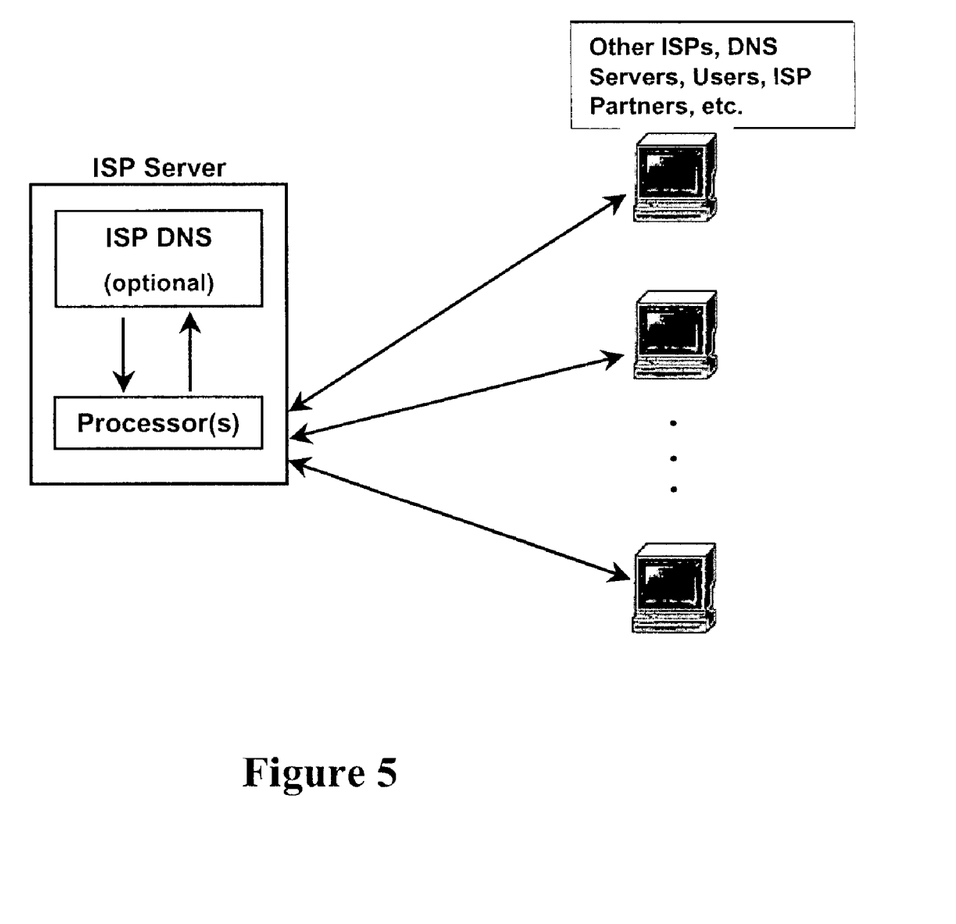
FIG. 5 illustrates how the systems and methods of the present invention may be implemented at the ISP level.

According to embodiments of the system, software and/or hardware are provided. The software comprises instructions residing on one or more computer readable media for implementing method steps of the invention. In preferred embodiments, the system comprises at least one Internet appliance of the invention, and the system is implemented with one or more ISPs containing one or more ISP DNSs. See, for example, FIG. 5, which depicts such a system. In these embodiments, the various pieces of hardware, software, and functional units of the Internet appliance can reside on the ISP DNS server(s) or processors, on separate hardware from the ISP DNS server(s), or partially on the ISP DNS server(s) or processors, and partially on separate hardware. In certain embodiments, the Internet appliance is provided entirely on separate hardware from the ISP DNS server(s) or processors. In a similar manner as the hardware in general, the Internet appliance of the invention and the ISP DNS server(s) or processors can be physically connected via cables, wires, or the like. The connection can be direct (i.e., from one to the other without any intervening hardware, except via the connector) or indirect (i.e., through one or more other hardware devices, such as circuit boards, filters, etc.). In other embodiments, the connection is not a physical connection (e.g., it is a connection via electromagnetic energy, such as infrared signals, radio signals, microwave signals, optical signals, and the like). In certain embodiments, the Internet appliance is implemented directly within the ISP DNS server, or processor (e.g., by insertion of a circuit board into the server). In other embodiments, certain functionalities are implemented directly within the ISP servers or processors, while other functionalities are implemented one or more other physical components, which are connected, either physically or non-physically. In embodiments, the Internet appliance comprises at least one processor that stores/generates DNS session logs at the ISP level.

Regardless of the layer at which the systems and methods operate, the systems and methods can be, but are not necessarily, implemented without the need to install any new hardware or software into registry or ISP servers, and thus are modular, highly adaptable, and easy and cost-effective to implement and update on one or numerous servers. In embodiments, such as those where the systems and methods function at Layer 2, the hardware, software, and system of the invention are capable of resolving non-ASCII character sets, which is an advantage for session data stored in languages not encompassed by the ASCII set, such as various Asian languages. In addition, because the Internet appliance of the invention can be provided partially or entirely as software, it can be implemented and maintained (e.g., updated) rapidly, easily, and inexpensively. Moreover, the present invention may be implemented with any browser, operating system, etc.

In embodiments of the systems (and methods) of the invention, the identity of a user may be determined by the IP Address of the requester in order to bind a particular DNS request with a particular requester. When the systems and methods of the invention sit at or before the ISP DNS layer, and particularly when they utilize Layer 2 processing, the IP Address of the requester can be mapped and bound to a Media Access Control (MAC) address. In addition, the ability to bind a particular IP Address to a particular MAC Address also enables an efficient opt-in/out functionality to be provided by the present systems and methods. Moreover, when queries are performed from a particular IP address, a Session vector |S| may be created at the ISP level, which contains the identity of a Host sequence. Various algorithms (such as genetic algorithms) are then used to match sequences of hosts to gain Session match scores. These scores are then used to predict the probability of a page being visited in the future. By mapping keywords to hosts, a concept map of what a person is looking for may be built.

In preferred embodiments, the present invention integrates Internet search engine functions, partially or wholly within the ISP server machines, or as a separate server sitting partially or wholly between the ISP and the user, or between the DNS server and the user. Although generally presented herein as a single unit or piece of hardware and software, the present invention can be implemented as functional units, each independently being carried out on the same or a different piece of hardware as any other functional unit. In embodiments, the ISP DNS and Internet appliance are functional platforms that make up part of the systems and methods of the invention. The ISP DNS and/or Internet appliance can comprise a single unit of hardware (e.g., a server) or multiple units. The ISP DNS and/or Internet appliance can analyze the information provided by user session data, and create session maps and session vectors in order to provide highly relevant rankings.

Accordingly, it is important to note that various pieces of hardware and features of the systems of the invention, while being implemented through hardware and software, are functional platforms made up of functional elements. Thus, each platform may exist on a single or multiple different pieces of hardware. Furthermore, each functional unit may be resident on a single or multiple different pieces of hardware, located in the same geographical area or in widely dispersed geographical areas. It is well within the skill of those of skill in the art to implement different functions on different pieces of hardware, which are either directly connected or connected through one or more intervening pieces of hardware. Likewise, although software to control different functionalities that are located on different pieces of hardware, or that exist as multiple copies within the system is part of the present invention, other software that can be implemented to further control certain aspects of the methods and systems, which can be implemented by the practitioner of the invention based on various desires, can be integrated into the present invention without undue or excessive experimentation by one of skill in the art.

In certain embodiments, the Internet appliance may return customer-specific, geographically-relevant, and/or time-relevant content based upon a profile stored for that particular requesting computer or ISP. The participating ISP partner, which could be an advertising partner, a search engine partner, an ad network, a distributor of an ad network, and the like returns content for the specific customer, for the location of the requesting computer or ISP, and/or based on the subject matter of the query. This can be done through a common Application Program Interface (API) to the participating ISP partners or defined by the participating ISP partners. The Internet appliance may build and send a ranking result page, optionally with content from the participating partner(s). In addition, the result page may be built dynamically in real time and/or on-the-fly based upon profile information stored for the ISP or based upon the IP Address of the requester. The IP Address may be used to localize the requester all the way down to a known individual user and/or provide information about the geo-location of the requesting computer.

One advantageous feature of certain architectural configurations of the present hardware (e.g., Internet appliance) derives from the fact that the hardware can be a general purpose software engine. As such, it can run software modules other than those of the present invention to deliver other services at this infrastructure layer. For example, it may, in embodiments, be a DNS server, or comprise a part of a DNS server. It is appreciated that the software may be programmed using any conventional language, including C++, Java, etc. In addition, it is to be noted again that the hardware is not limited in the number of pieces or location of hardware that are depicted and discussed in exemplary embodiments, and that other hardware and software may be included in different embodiments, such hardware and software being implemented for various functions typically performed by computers and Internet trafficking servers. Although the hardware, and particularly the Internet appliance, of the present invention has been described in terms of its functions it is to be understood, however, that the hardware, while providing these and other functions, need not provide all of the functions discussed herein in each embodiment.

In yet another aspect, the invention provides a storage medium for storing computer programs, files, data, etc. The storage medium may be any suitable media for long-term or short-term storage of computer information. In some embodiments, the storage medium is a portable storage medium, which can be inserted and removed from a computer. The storage medium thus may be a magnetic storage medium, an optical storage medium, or the like. It thus may be a hard drive, tape, floppy disk, RAM, memory stick, CD, DVD, non-volatile memory card, magneto-optical disk, or any other media suitable for storage of computer software. In embodiments, it is RAM that comprises a part of a DNS server or other computer. The storage medium can be provided with a computer program, or a part thereof, stored on it, where the computer program, or part thereof, comprises instructions for performing a method, or part thereof, of the invention. The storage medium is preferably connected, either physically or functionally, to at least one piece of hardware according to the invention. In embodiments, the storage medium comprises a part of a system of the invention.

In a further aspect, the invention provides a method of doing business using a computer, and preferably a computer connected to a network, such as the Internet. In general, the method of doing business comprises ranking pages and/or hosts on a network, providing search results based on those ranked pages and/or hosts, and charging receivers of the results, providers of the results, or both, a fee for providing the results. In various embodiments, the present invention enables ISPs to act as distributed search engines. Such search engine capabilities may be implemented in whole, or in part, in the Internet appliance and/or ISP DNS. In addition, higher ranking of search results that are geographically proximate to the requesting computer can create business opportunities and revenues for DNS operators, such as ISPs and/or corporations maintaining servers dedicated to their businesses. Accordingly, the results are highly relevant to the subject matter of the query, point of origin of the query, geographic location of the point of origin of the query, time of submission of the query, information provided by the Internet infrastructure, or any combination of two or more of these.

In further embodiments, the method ranks pages and/or hosts based on a combination of DNS data, as well as information provided by advertisers, and provides search results based on those rankings. Thus, the method of doing business may include a method for effective ad targeting using the Internet that benefits advertisers, users and/or ISP providers. For example, the location of the requester can be used to provide geographically relevant information in response to a keyword search. Consequently, advertisements from companies only in the general or specific area of the computer making the request would be displayed with the search results. As a result, the requester will see ads from companies in his geographical area, and the advertiser will receive highly effective ad targeting to his audience. Likewise, a web page for a local company in a business related to the search term will be likely to be ranked more highly than a web page from a company somewhere else in the country or in the world. In addition, while the geo-location of the requestor is of great interest to advertisers in providing effective ad targeting, it can also benefit the user by providing Internet search results that are more highly ranked based on location, which could be important when searching for products, services, or points of interest in the user's locale.

In embodiments, the present invention provides systems and methods for doing business with a computer including: creating one or more session maps of page request sequences for a particular ISP using DNS data; ranking pages based, at least in part, on information in one or more session maps; and combining the page rankings with page rankings from one or more ISPs, participating partners, or both. In embodiments, session maps and/or corresponding session vectors may be received from one or more participating partners, ISPs, or both, combined and/or synthesized; and used to modify page and/or host rankings based on such information. In embodiments of the systems and methods, a computer, such as an Internet appliance, is present or provided for creating one or more session maps and/or session vectors of sequences of host requests at the ISP level; ranking pages and/or hosts based, at least in part, on information from the session maps; and combining the page rankings with page rankings from one or more ISPs, participating partners, or both.

In other embodiments, the method comprises: creating one or more session maps of a series of page requests obtained from an ISP; and providing results based in part on information from the session maps, wherein the results are highly relevant to the subject matter of the query, point of origin of the query, geographic location of the point of origin of the query, time of submission of the query, information provided by the Internet infrastructure, or any combination of two or more of these. In embodiments, the method of doing business includes a method for effective ad targeting using the Internet.

Providing Internet search results is often a lucrative business. However, many Internet service providers (ISPs) are unaware that they possess this valuable business asset. According to a further embodiment, the present invention provides methods of doing business between ISPs. In one aspect, the present invention enables ISPs to act as distributed search engines. Such search engine capabilities may be implemented in whole, or in part, in the Internet appliance and/or ISP DNS. In addition, by ranking search results that are geographically proximate to the requesting computer more highly can create business opportunities and revenues for DNS operators, such as ISPs and/or corporations maintaining servers dedicated to their businesses.

Thus, the present invention offers both technical and business solutions to shortcomings of prior ranking techniques by analyzing session logs at the ISP level, resolving various information, including but not limited to, the validity, time, content, and/or geographical location of origin of the sessions, and providing ranking of web pages based on e.g., geography or number of hops required, content, or time. Moreover, the present hardware (e.g., Internet appliance), when sitting between a user and the ISP DNS or when integrated, partially or wholly, into the ISP DNS, can identify the IP Address, and thus the location or origin, of the request. This information can be useful in providing geographically relevant query results, and/or connecting the user to the closest server, defined geographically or by connection pathway length (i.e., number of hops), containing the information requested. This function cannot currently be provided by any known and used system that is implemented at the registry level.

Further by implementing the systems and methods in a distributed manner, for example at the ISP level, a user may be geo-located based on his IP Address. Such information is not transmitted from the ISP level to the registry level, and thus not available to the Internet appliance if implemented at that level. Currently search engines available on the Internet strive to identify relevant web sites and advertising based on keywords submitted in a query and/or link-based analysis. Unfortunately, the web sites and advertising provided by such search engines in response to queries do not take into account the geographic location of the particular user submitting the query, unless the user specifically provides information on his location, either by manually entering the information in response to a request from the web site, or by transmission from a cookie. Thus, for example, in response to a query about art shows, a user in the Washington, D.C. metropolitan area may receive highly ranked results for pages dedicated to art shows in Tennessee, Mexico, Japan, India, or anywhere else in the world. Likewise, in response to a query about the availability a certain model automobile for purchase, the search engine might provide highly ranked results that list the major car manufacturers and car clubs, neither of which would contain the desired results (i.e., a car dealership in the requestor's immediate geographical area that sells the car of interest). Furthermore, the search engines do not take into account the time that the query was made, and thus cannot intentionally provide time-relevant results. Because results from search engines typically are ranked based in part on the number of visits to and/or links to various web sites, sites of large or popular corporations or organizations generally are displayed as the highest ranked results, while more relevant results may be buried well below these results. The present invention overcomes these deficiencies and provides users with an enhanced search experience with results generated at the ISP level, which are better tailored to the user.

Figure 2:
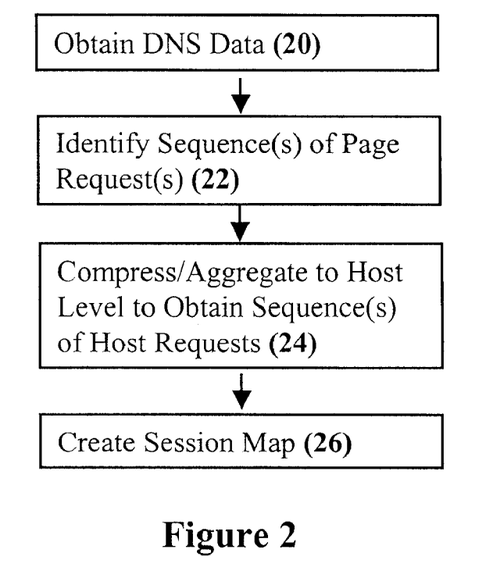
FIG. 2 is a flowchart representing one embodiment of the present invention.

Turning now to the figures, and in particular to FIG. 2, an embodiment of the invention is described for creating session maps of user requests based on DNS data. As depicted in step (20), the DNS data for a particular session is obtained e.g., from one or more participating DNS, ISP DNS, etc. DNS data includes, among other things: the IP Address and the Domain or Host portion of a Uniform Resource Locator (URL). A web proxy can include a directory path name of the requested page; typed keywords; time of request; referring URL or IP Address, etc. For example, one session entry may comprise the directory pathname of a requested page http colon double slash www dot washingtonpost dot com slash ?nav=globetop) along with an associated timestamp. Furthermore, because the IP Address of the requestor is known, part or all a sequence of page requests resolved to the same IP Address may be determined for a particular session. Typically, an IP address (e.g., dynamically) assigned to a requestor may be obtained from the requestor's ISP. Alternatively, instead of identifying sequence requests for individual users, sequence requests may be identified for groups of users. Additionally, the ISP DNS may collect the necessary statistics relating to specific IP Addresses requested by users. According to such a system or method, the ISP DNS may also collect information and statistics about all DNS requests made to the ISP DNS. These statistics may be used for building a database for the system and method that provides content-relevant, geographically-relevant, and/or time-relevant information.

As shown in step (22), the page sequences for one or more users are identified. The page sequences are compressed, e.g., to the host that each page resides in, to form sequence of host requests in step (24). For example, session entries to the same host such as : http colon double slash www dot cars dot com slash go slash buyIndex do jsp?aff=national; http colon double slash www dot cars dot com slash go slash crp slash index don't jsessionid=5TDPQKNJIKCCDLAYIJAA5IY?aff=national; and http colon double slash www dot cars dot com slash go slash advice slash index dot jsp would all be aggregated to a single node represented e.g., www dot cars dot com. In another example, session entries belonging to different hosts would be aggregated to their respective host and a session vector formed representing the sequence of hosts visited. Thus, if a user visited www.cars.com www dot cars dot com then www dot autozone dot com and then www dot autoparts dot com, a session vector may be created containing the sequence of sites visited: www dot cars dot com, www dot autozone dot com, www dot autoparts dot com. A session map may then be formed in step (26) from the sequences of host requests. Advantageously, the amount of information in the session map is thus reduced to only those hosts containing pages visited during the session.

Figure 3:
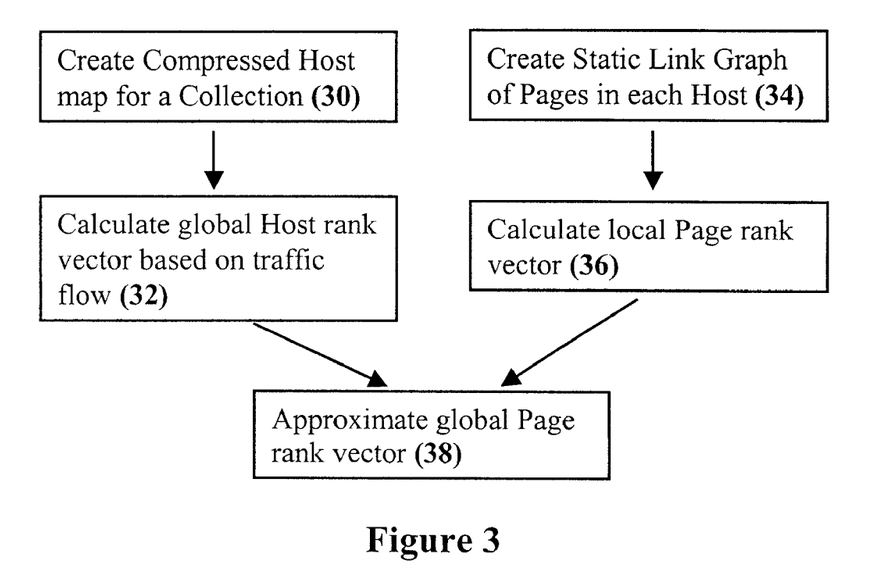
FIG. 3 is a flowchart representing another embodiment of the present invention.

According to a further embodiment, efficient approximations of page rank are described in FIG. 3. As an initial step, pages in a collection are compressed, or aggregated, to the host that each page resides in to form a compressed Host map (step (30)). For example, by aggregating by host sections visited (and effectively ignoring pages and intra-links), a graph may be created where nodes represent hosts instead of pages. In this way, a compressed Host map of popular sites may be easily visualized.

In step (32), a global Host rank vector for the collection 1×|H|, where |H| is the number of hosts visited, may be (e.g., dynamically) obtained by applying a traffic flow model to the compressed Host map. For example, let P(ij) be the proportion of all web traffic on a link from host (i) to host (j) (if there is no link from host (i) to host (j), then P(ij)=0). The proportion of traffic P(ij) from host (i) to host (j) with respect to the sum of all traffic (where the sum of variables P(ij) equal 1 for all hosts) is estimated. The proportion of traffic with respect to host (j) may then be used as an indication of the traffic rank (or popularity) of host (j). Thus, by applying a dynamic traffic flow model to the aggregated Host map, a highly relevant global Host rank vector may be calculated. However, it is to be appreciated that a global Host rank vector may also be obtained by applying other models, such as PageRank or BlockRank.

As shown in step (36), local page rank vectors 1 ×|H| where |H| is the number of pages in Host (i)) may be calculated for each host based on the static link graph (34) for that host. Each host may be visited to determine the static link graph between pages for that host according to known techniques. For example, to efficiently calculate local page rank vectors, only intra-host links are used and the intra-host links are ignored. However to further speed up calculations, hosts visited during a particular session are determined and only local page ranks for those hosts are calculated. Thus, by applying the PageRank model to only the hosts visited, the amount of computation needed to derive the local Page rank vector is greatly reduced. Furthermore, the local Page rank vectors may be calculated prior to, subsequent to, or concurrently with the calculation of the global Host rank vector. For example, local Page rank vectors may be pre-computed for certain hosts and then combined with dynamically obtained Host rank vectors to provide a global page rank on-the-fly (see below).

In step (38), a global Page rank may be approximated by simply combining the global host rank vector 1 ×|H| and the local page rank vector 1 ×|H|. For example, to approximate the global page rank vector, the local Page rank vector for host |H| is multiplied by the probability of being in that host of the collection, given the $i^{th}$ element of the Host rank vector. As a result of combining the global Host rank vector based on a traffic flow model with the local page rank vector, more relevant Page rank approximations may be provided. Moreover, by limiting the number of pages and/or hosts required for calculating the global Host rank vector and local page rank vector, calculations become far less complex. In this way, a global page or host rank vector may be calculated more quickly, and in some cases, dynamically and/or on-the-fly.

Figure 4:
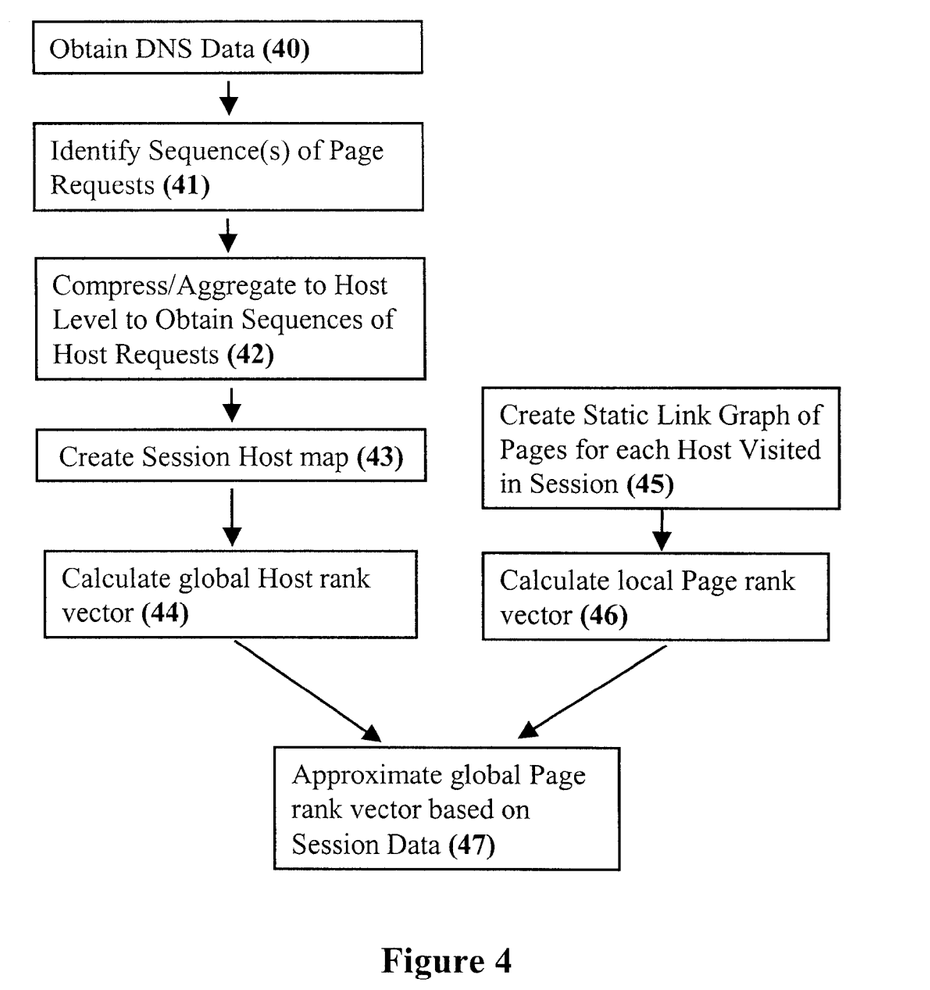
FIG. 4 is a flowchart representing yet another embodiment of the present invention.

FIG. 4 shows another embodiment of the invention whereby pages are efficiently ranked using, at least in part, DNS and/or ISP session data. In step (40), DNS/ISP data (such as that discussed above) is obtained and used to identify pages visited during a particular session. Step (41) shows where one or more sequences of page requests are identified in a manner similar to step (22). In step (42), the pages are aggregated e.g., to the host that each page resides in to obtain sequences of host requests. For example, session entries to the same host such as: : http colon double slash www dot cars dot com slash go slash buyIndex do jsp?aff=national; http colon double slash www dot cars dot com slash go slash crp slash index don't jsessionid=5TDPQKNJIKCCDLAYIJAA5IY?aff=national; and http colon double slash www dot cars dot com slash go slash advice slash index dot jsp are aggregated to a single node represented e.g., www.cars.com. In another example, session entries belonging to different hosts would be aggregated to their respective host and a session vector formed representing the sequence of hosts visited. Thus, if a user visited www dot cars dot com then www dot autozone dot com and then www dot autoparts dot com, a session vector may be created containing the sequence of sites visited: www dot cars dot com, www dot autozone dot com, www dot autoparts dot com. A session map may then be formed in step (43) from the identified sequences. Advantageously, the amount of information in the session map is thus reduced to only those hosts visited during the session. In step (44) a global Host rank vector is calculated using techniques similar to step (32). In steps (45) and (46), local Page rank vectors may also be calculated either: before, during, or after, calculation of the global Host rank vector similar to steps (34) and (36) above. Finally, in step (47), a global Page rank vector is approximated similar to step (38) above.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. For example, the principles of the invention in their broader aspects may be applied to other network systems such as for telephony. The scope of the invention is to be defined only by the claims appended hereto, and by their equivalents. Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

REFERENCES

The following references were cited herein. The references are incorporated herein by reference in their entirety, as are other references cited above, including, but not necessarily limited to, U.S. patents and patent application publications.

1. Amy N. Langville and Carl D. Meyer. Google's PageRank and Beyond. pp. 32-33, 95-96, 136-137. Princeton University Press, 2006.
2. Kamvar, S. D., Taher H. Haveliwala, Christopher D. Manning, and Gene H. Golub. Exploiting the block structure of the Web for computing PageRank. Technical Report 2003-17, Stanford University, 2003.
3. Andrei Broder, Farzin Maghoul, Ronny Lempel, and Jan Pedersen. Efficient PageRank Approximation via Graph Aggregation. WWW2004, New York. ACM Press.
4. Gui-Rong Xue, Qiang Yang, Hua-Jun Zeng, Yong Yu and Zheng Chen. Exploiting the Hierarchical Structure for Link Analysis. SIGIR 2005, Salvador, Brazil. ACM Press.
5. John A. Tomlin. A new paradigm for ranking pages on the World Wide Web. *In the Twelfth International World Wide Web Conference*, New York, 2003. ACM Press.
6. Alexa Internet, Inc.; http://www.alexa.com/prod_serv/traffic_learn_more.html

The invention claimed is:

1. A method for doing business using a computer, said method comprising:
   obtaining ISP DNS data for a particular session;
   obtaining information from one or more advertisers;
   using a computing device to rank pages and/or hosts for the session based on a combination of DNS data from one or more ISP and/or advertiser information,
   wherein ranking pages comprises
      calculating a global host rank vector for hosts in the session;
      calculating a local page rank vector for pages of each host in the session by applying in the page rank model to only the hosts visited, wherein the local page rank vectors are calculated prior to, subsequent to, or concurrently with the calculation of the global host rank vector, wherein said local page rank vectors are precomputed for certain hosts and combined with dynamically obtained host rank vectors to provide a global page rank on-the-fly; and approximating a global page rank vector based on a combination of the global host rank vector and local ease rank vector based on a dynamic traffic flow model and/or static page ranking model; and charging a fee for providing the ranked pages and/or advertiser information to one or more parties.

2. The method of claim 1, wherein the party is a user, and the ranked results are provided in response to a query.

3. The method of claim 2, wherein the fee is charged to the user and/or advertiser for providing the ranked results.

4. The method of claim 1, wherein the ranked results are provided to multiple ISPs, some of which might not be ISPs that provided data.

5. The method of claim 4, further comprising charging the ISPs that did not provide data a fee for the ranked results.

6. A computer program residing on one or more computer readable storage media, wherein the program comprises instructions that, when executed by a computer, executes the method of claim 1.

* * * * *